(12) United States Patent
Zhang et al.

(10) Patent No.: US 9,557,587 B2
(45) Date of Patent: Jan. 31, 2017

(54) ATTACHING DEVICE AND ATTACHING METHOD

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Qing Zhang, Beijing (CN); Shancai Zhang, Beijing (CN); Yifei Zhan, Beijing (CN); Rikun Jiang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/803,879

(22) Filed: Jul. 20, 2015

(65) Prior Publication Data
US 2016/0170245 A1 Jun. 16, 2016

(30) Foreign Application Priority Data
Dec. 12, 2014 (CN) .......................... 2014 1 0764294

(51) Int. Cl.
| | | |
|---|---|---|
| *H05B 33/10* | (2006.01) | |
| *H01L 51/56* | (2006.01) | |
| *G02F 1/13* | (2006.01) | |
| *G06F 3/041* | (2006.01) | |
| *G02F 1/1333* | (2006.01) | |
| *G02F 1/1339* | (2006.01) | |

(52) U.S. Cl.
CPC .......... *G02F 1/1303* (2013.01); *G02F 1/1339* (2013.01); *G02F 1/13338* (2013.01); *G06F 3/041* (2013.01); *G02F 2001/133354* (2013.01)

(58) Field of Classification Search
CPC .. G02F 1/1303; G02F 1/1339; G02F 1/13338; G02F 2001/133354; G06F 3/041
See application file for complete search history.

(56) References Cited

U.S. PATENT DOCUMENTS

| | | | |
|---|---|---|---|
| 6,459,462 B1 * | 10/2002 | Seraphim | G02F 1/13336 156/298 |
| 2016/0001536 A1 * | 1/2016 | Ok | B32B 37/003 156/256 |

* cited by examiner

*Primary Examiner* — Donald Raleigh
(74) *Attorney, Agent, or Firm* — Nath, Goldberg & Meyer; Joshua B. Goldberg

(57) ABSTRACT

The present invention belongs to the field of display technology, particularly relates to an attaching device and a corresponding attaching method for forming a curved display panel. The attach device is used for a curved surface attachment between a display substrate and a touch substrate, comprises a base station, a curvature adjusting bench and an attaching roller, wherein, the base station is fixed, the curvature adjusting bench includes a plurality of sub-benches with different heights and being capable of moving with respect to each other within the base station, the plurality of sub-benches are used for making the display substrate and the touch substrate to be attached, which are provided within the base station and located on the curvature adjusting bench, have a preset curvature, the attaching roller is used for rolling on the display substrate and the touch substrate to be attached to form a curved display panel.

18 Claims, 2 Drawing Sheets

ATTACHING DEVICE AND ATTACHING METHOD

FIELD OF THE INVENTION

The present invention relates to the field of display technology, and particularly, to an attaching device for forming a curved display panel and a corresponding attaching method.

BACKGROUND OF THE INVENTION

With development of display technology, CRT display devices have gradually faded out of people's lives, and flat display devices with light weight and thin thickness replace them. Currently, display panels of the flat display devices are mainly planar display panels. However, since distances between viewer's eyes and the ends of the planar display panel and between viewer's eyes and the center of the planar display panel are not equal to each other, resulting in that the viewer feels an unfavorable display effect at the ends of the planar display panel, a poor viewing effect is sensed, which easily produces visual fatigue for the viewer.

Thus, in order to meet people's demands, curved display panels appear. Compared to the planar display panel, for the curved display panel, distances between viewer's eyes and the ends of the curved display panel and between viewer's eyes and the center of the curved display panel may be equal to each other, thus display pictures at the ends of the curved display panel show no loss for the viewer, a good viewing effect is produced, which is comfortable for the viewer's vision. Moreover, the larger the size of the curved display panel is, the better the viewing effect is, thus curved display panels also gradually develop to be of large size.

Meanwhile, in order to improve user's experiences, a present planar display panel further comprises a touch substrate added on basis of a display substrate so that a touch function of the display panel is achieved. Currently, an attaching device and a corresponding attaching process for forming a planar display panel with a touch function are as follows: as shown in FIG. 1, fixing a display substrate 11 on a lower base station 2 by vacuum suction, wherein an adhesive layer 12 is coated on the display substrate 11; fixing a touch substrate 13 on an upper base station 1 by vacuum suction; making the upper base station 1 move downward so that the touch substrate 11 contacts with the adhesive layer 12 on the display substrate 11; then compressing the display substrate 11, the adhesive layer 12 and the touch substrate 13; finally, ultraviolet curing the adhesive layer 12, so that the planar display panel is formed.

Currently, most of touch display panels in the market are planar touch display panels, and there is no universal attaching device with high efficiency for forming a curved display panel with a touch function. Thus, along with urgent need for curved display panels, it has become an urgent technical problem to be solved to design an attaching device and a corresponding attaching method for forming a curved touch display panel.

SUMMARY OF THE INVENTION

In view of above defects in the prior art, embodiments of the present invention provide an attaching device and a corresponding attaching method for forming a curved display panel, which can conveniently achieve a curved surface attachment between a display substrate and a touch substrate to manufacture a curved touch display panel.

An embodiment of the present invention provides an attaching device for a curved surface attachment between a display substrate and a touch substrate, which comprises a base station, a curvature adjusting bench and an attaching roller, wherein, the base station is fixed, the curvature adjusting bench includes a plurality of sub-benches with different heights and being capable of moving with respect to each other within the base station, the plurality of sub-benches are used for making the display substrate and the touch substrate to be attached, which are provided within the base station and located on the curvature adjusting bench, have a preset curvature, the attaching roller is used for rolling on the display substrate and the touch substrate to be attached so that a curved display panel is formed.

Preferably, the base station includes a first station and a second station provided symmetrically, the plurality of sub-benches form a first bench and a second bench distributed symmetrically and are provided correspondingly at insides of the first station and the second station respectively; and in the first bench and the second bench, the heights of the sub-benches respectively close to the first station and the second station are highest but respectively lower than the heights of inner sides of the first station and the second station, the sub-benches in the first bench are connected with each other and are arranged successively in a direction from the first station to the second station in a descending order of height, and the sub-benches in the second bench are connected with each other and are arranged successively in a direction from the second station to the first station in a descending order of height.

Preferably, the attaching device further comprises a suction unit provided at a central area within the base station, the suction unit comprises a retractable support and a suction cup provided on top of the retractable support, the suction cup is used for sucking the display substrate to be attached with the touch substrate.

Preferably, the sum of distances between the sub-benches adjacent to each other is equal to or less than the distance between the first station and the second station.

Preferably, in the first bench and the second bench, sub-benches adjacent to each other are connected with each other by a chain, and distances between the sub-benches adjacent to each other are adjusted by adjusting the chain; or sub-benches adjacent to each other are connected with each other by sliding rails overlapped with each other, and distances between sub-benches adjacent to each other are adjusted by adjusting overlap lengths of the sliding rails overlapped with each other.

Preferably, the attaching device further comprises a control unit, the chain or the sliding rails are connected with a first motor, and the control unit controls the first motor to drive the chain or the sliding rails to move, so that the sub-benches move with respect to each other within the base station.

Preferably, the attaching roller rolls along a curved surface formed by the display substrate and the touch substrate, for example, from the first station to the second station or from the second station to the first station, so that the display substrate and the touch substrate are attached with each other to form the curved display panel.

Preferably, tracks are provided at both sides of the plurality of sub-benches in a direction parallel to a moving direction of the sub-benches within the base station, for example, between the first station and the second station, the curvature of the tracks is adjustable according to the curvature of the display substrate and the touch substrate, two ends of shaft of the attaching roller are inserted into the tracks, the tracks provide a defined path for rolling of the attaching roller, for example, from the first station to the second station or from the second station to the first station.

Preferably, the attaching device further comprises a control unit, the attaching roller is connected with a second motor, and the control unit controls the second motor to drive the attaching roller to roll, for example, from the first station to the second station or from the second station to the first station.

Preferably, each of the first station and the second station is of an L shape, and the L shape of the first station and the L shape of the second station are provided oppositely;

the sub-benches with highest height are provided close to inner sides of the L shapes of the first station and the second station, respectively.

Preferably, each of the sub-benches is of a cuboid shape, and height difference between adjacent sub-benches is less than one centimeter.

An embodiment of the present invention also provides an attaching method implemented by the above attaching device, for attaching a display substrate and a touch substrate, the method comprises steps of:

S1, forming an adhesive layer on the display substrate to be attached with the touch substrate;

S2, placing the display substrate formed thereon with the adhesive layer on the curvature adjusting bench within the base station;

S3, adjusting distances among the sub-benches of the curvature adjusting bench to be appropriate distances so that the display substrate have a preset curvature;

S4, placing the touch substrate to be attached with the display substrate on the adhesive layer on the display substrate;

S5, making the attaching roller roll on the touch substrate so that the display substrate and the touch substrate are compressed to be attached with each other.

Preferably, before the step of S4, the attaching method further comprises: making the suction unit suck the display substrate so that the display substrate to be attached with the touch substrate has an accurate preset curvature.

Preferably, in the step of S1, the adhesive layer is an adhesive layer of optical clear resin (OCR); before the step of S2, the attaching method further comprises a step of ultraviolet pre-curing the adhesive layer; and after the step of S5, the attaching method further comprises a step of ultraviolet curing the adhesive layer.

Preferably, in the step of S5, adjusting the curvature of the tracks so that the height of the tracks at any position is lower than the sum of the height of the sub-bench at the corresponding position, the thickness of the display substrate, the thickness of the adhesive layer, the thickness of the touch substrate and the radius of the attaching roller, thereby applying a downward pressure by the attaching roller when the attaching roller rolls on the touch substrate to be attached with the display substrate.

The present invention has following beneficial technical effects: it is convenient to achieve a curved surface attachment between the display substrate and the touch substrate to form a curved touch display panel, and it is efficient and universal.

DETAILED DESCRIPTION OF EMBODIMENTS

To make those skilled in the art better understand technical solutions of the present invention, the attaching device and the corresponding attaching method according to embodiments of the present invention will be further described in detail below in conjunction with accompany drawings and specific implementations.

First Embodiment

The present embodiment provides an attaching device for a curved surface attachment between a display substrate and a touch substrate.

Figure 1:
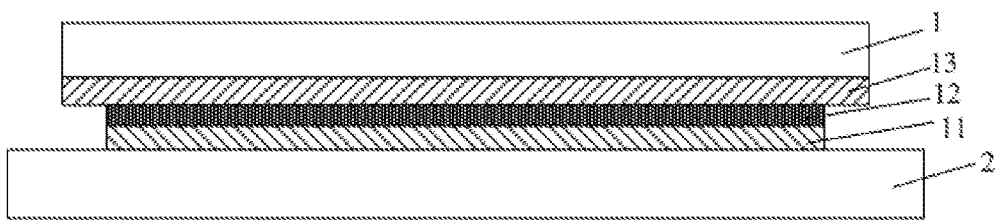
FIG. 1 shows a structural diagram of an attaching device for forming a curved display panel in the prior art.
Figure 2:
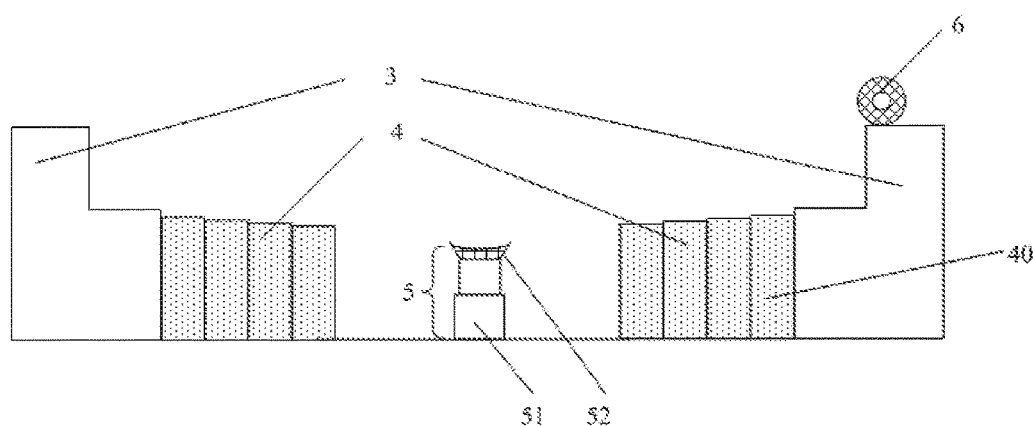
FIG. 2 shows a structural diagram of an attaching device for forming a curved display panel in a first embodiment of the present invention.

As shown in FIG. 2, the attaching device comprises a base station 3, a curvature adjusting bench 4 and an attaching roller 6, wherein, the base station 3 is fixed, the curvature adjusting bench 4 includes a plurality of sub-benches 40 with different heights and being capable of moving with respect to each other within the base station 3, the plurality of sub-benches 40 are used for making the display substrate (i.e., LCD open cell) 11 and the touch substrate (i.e., Touch panel) 13 to be attached have a preset curvature, the attaching roller 6 is used for rolling on the display substrate 11 and the touch substrate 13 to be attached so that a curved display panel is formed.

The base station 3 and the curvature adjusting bench 4, which are regarded as a work table for attaching the display substrate 11 and the touch substrate 13, are capable of supporting the display substrate 11 and the touch substrate 13 to be attached, and adjusting the display substrate 11 and the touch substrate 13 to be of an appropriate curvature, that is, defining the shape of the display substrate 11 and the touch substrate 13 to be attached and providing a supporting surface for rolling of the attaching roller 6. It should be understood that, fixation of the base station 3 is relative to movable of the sub-benches 40 of the curvature adjusting bench 4 with respect to each other. In fact, in order to make the attaching device to be adaptable to form display panels with different dimensions, the internal dimension of the base station 3 may be flexibly adjusted in accordance with actual conditions, for example, pulley wheels may be provided on the bottom of the base station 3 for facilitating the adjustment of the internal dimension of the base station 3, which will not be limited here.

Figure 3:
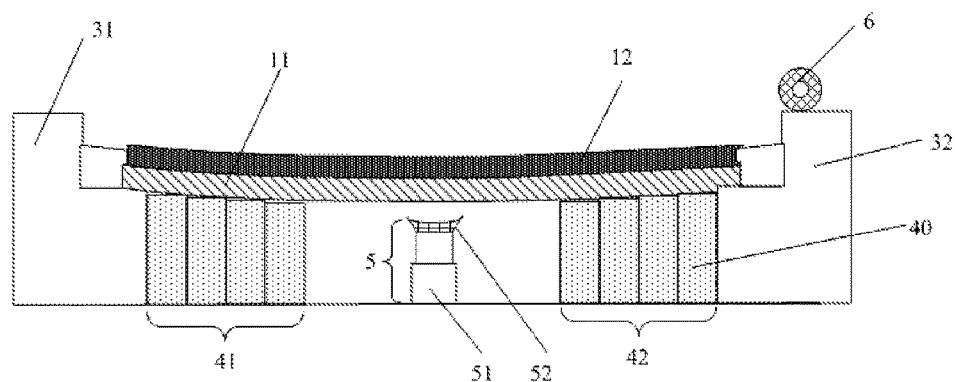
FIG. 3 shows a structural diagram of the attaching device of FIG. 2 when a display substrate and a touch substrate to be attached with each other are placed thereon.

Specifically, as shown in FIG. 3, the base station 3 includes a first station 31 and a second station 32 provided symmetrically, the plurality of sub-benches 40 form a first bench 41 and a second bench 42 distributed symmetrically and are provided correspondingly at insides of the first station 31 and the second station 32 respectively, that is, the first bench 41 is close to the first station 31, and the second bench 42 is close to the second station 32. In the first bench 41 and the second bench 42, the heights of the sub-benches 40 respectively close to the first station 31 and the second station 32 are highest but respectively lower than the heights of inner sides of the first station 31 and the second station 32, the sub-benches 40 in the first bench 41 are connected with each other and are arranged successively in a direction from the first station 31 to the second station 32 in a descending order of height, the sub-benches 40 in the second bench 42 are connected with each other and are arranged successively in a direction from the second station 32 to the first station 31 in a descending order of height. By successively arranging the sub-benches 40 from the first station 31 and the second station 32 to the second station 32 and the first station 31 respectively in a descending order of height, when the sub-benches 40 are distributed with intervals, a curved supporting surface with a low center and two high ends is naturally formed, thus, under the effect of gravity, the display substrate 11 on the curved supporting surface is naturally curved, and has a preset curvature depending on the shape of the curved supporting surface.

In the attaching device of the present embodiment, each of the first station 31 and the second station 32 is of an L shape, and the L shape of the first station 31 and the L shape of the second station 32 are provided oppositely; the sub-benches 40 with highest height are provided close to inner sides of the L shapes of the first station 31 and the second station 32 respectively. In order to obtain a gentle curvature, each of the sub-benches 40 is of a cuboid shape, and height difference between adjacent sub-benches 40 is less than one centimeter.

In order to obtain a better curvature of the display panel, the attaching device further comprises a suction unit 5 provided at a central area between the first station 31 and the second station 32, the suction unit 5 comprises a retractable support 51 and a suction cup 52 provided on top of the retractable support 51, the suction cup 52 is used for sucking the lower surface of the display substrate 11 to be attached with the touch substrate 13. In the present embodiment, distances between the suction unit 5 and the first station 31 and between the suction unit 5 and the second station 32 are equal to each other. The function of the suction unit 5 is as follows: during sucking the display substrate 11 to move downward, finely adjusting the curvature of the display substrate 11 in cooperation with the curvature adjusting bench 4, for example, sucking downward the display substrate 11 to further reduce the radius of curvature of the display substrate 11; when the curvature adjusting bench 4 moves, the suction function of the suction cup 52 may be stopped, the suction cup 52 only supports the display substrate 11 gently and slowly rises or falls in cooperation with the display substrate 11 to avoid fragmentation of the display substrate 11; in addition, when the attaching roller 6 rolls on the display substrate 11 and the touch substrate 13 to attach the display substrate 11 with the touch substrate 13, the suction cup 52 provides a good supporting for that. It can be seen that, on basis of obtaining a better and fine curvature range, the suction unit 5 also provides better protection for the display panel.

It should be understood that, the suction cup 52 is connected with a vacuum system, and according to process conditions, an appropriate suction force can be obtained by adjusting, which will not be described in detail here.

The sub-benches 40 may be controlled in many modes, and in the attaching device of the present embodiment, the mode for controlling the sub-benches 40 is that: in the first bench 41 and the second bench 42, sub-benches 40 adjacent to each other are connected with each other by a chain (not shown in the drawings), and distances between the sub-benches 40 adjacent to each other are adjusted by adjusting the chain; or, sub-benches 40 adjacent to each other are connected with each other by sliding rails (not shown in the drawings) overlapped with each other, and distances between sub-benches 40 adjacent to each other are adjusted by adjusting overlap lengths of the sliding rails overlapped with each other.

The attaching device of the present embodiment further comprises a control unit (not shown in the drawings), and the movement of the sub-benches 40 with respect to each other in the base station 3 is controlled by the control unit. In the present embodiment, the chain or the sliding rails are connected with a first motor (not shown in the drawings), and the control unit controls the first motor to drive the chain or the sliding rails to move, so that the sub-benches 40 move with respect to each other within the base station 3.

In the present embodiment, the sum of distances between the sub-benches 40 adjacent to each other is equal to or less than the distance between the first station 31 and the second station 32. Thus, by providing the curvature adjusting bench 4 comprising the plurality of sub-benches 40 which are capable of moving with respect to each other, a better and a wider curvature range of the display panel can be obtained.

After the display substrate 11 and the touch substrate 13 are placed and adjusted to have a preset curvature, they are attached with each other to form a curved display panel by the attaching roller 6 in the attaching device. In the present embodiment, the attaching roller 6 rolls and presses down along a curved surface formed by the display substrate 11 and the touch substrate 13, for example, from the first station 31 to the second station 32 or from the second station 32 to the first station 31, so that the display substrate 11 and the touch substrate 13 are attached with each other to form the curved display panel. Since the attaching roller 6 rolls along the curved surface formed by the display substrate 11 and the touch substrate 13, the display substrate 11 and the touch substrate 13 are attached better.

Tracks (not shown in the drawings) are provided at both sides of the plurality of sub-benches 40 in a direction parallel to a moving direction of the sub-benches 40 within the base station, for example, between the first station 31 and the second station 32, the curvature of the tracks may be adjustable according to the curvature of the display substrate 11 and the touch substrate 13, two ends of shaft of the attaching roller 6 are inserted into the tracks, the tracks provide a defined path for rolling of the attaching roller 6, for example, from the first station 31 to the second station 32 or from the second station 32 to the first station 31.

In the attaching device of the present embodiment, the rolling of the attaching roller 6 is controlled by a control unit. In the present embodiment, the attaching roller 6 is connected with a second motor (not shown in the drawings), and the control unit controls the second motor to drive the attaching roller 6 to roll, for example, from the first station 31 to the second station 32 or from the second station 32 to the first station 31.

In order to obtain a display panel with a more natural curvature and a better curved display effect, the sub-benches 40 in the attaching device are used as a shaping module; in order to achieve automatically controlling for changing from a planar surface to a curved surface, the first motor and the second motor in the attaching device are used as a power module, the chain or the sliding rails are used as a driving module, so that the curvature adjusting bench 4 cooperates with the attaching roller 6 to achieve the manufacturing of the curved display panel better by a simple manner, thus a display panel which is capable of producing a good visual experience is provided.

Correspondingly, the present embodiment also provides an attaching method corresponding to the attaching device above for attaching the display substrate 11 and the touch substrate 13, the attaching method comprises the following steps of S1 through S6.

S1, forming an adhesive layer 12 on the display substrate 11 to be attached with the touch substrate 13.

In this step, the adhesive layer 12 is an adhesive layer of OCR, which is evenly applied on the display substrate 11. OCR is a kind of liquid optical adhesive and is usually used for attachment of transparent optical components, it has characteristics of high transparency, resistance to yellowing, resistance to blackening, low shrinkage, high bonding strength and so on after curing by ultraviolet irradiation.

S2, placing the display substrate 11 formed thereon with the adhesive layer 12 on the curvature adjusting bench 4 within the base station.

In this step, as shown in FIG. 3, the display substrate 11 applied with the adhesive layer 12 thereon is placed on the base station with the adhesive layer 12 being on top. Meanwhile, in order to ensure attachment effect of the adhesive layer 12, before this step, the attaching method further comprises a step of ultraviolet pre-curing the adhesive layer 12.

S3, adjusting distances among the sub-benches 40 of the curvature adjusting bench 4 to be appropriate distances so that the display substrate 11 have a preset curvature.

In this step, under the effect of gravity, the display substrate 11 is naturally curved, the curvature adjusting bench 4 moves (in other words, stretches) between the center of the base station and the first station 31 and between the center of the base station and the second station 32: when the sub-benches 40 of the curvature adjusting bench 4 move toward the center of the base station, the curvature of the display substrate 11 is reduced and the radius of curvature thereof is increased; when the sub-benches 40 of the curvature adjusting bench 4 move toward the first station 31 and the second station 32, the curvature of the display substrate 11 is increased and the radius of curvature thereof is reduced.

S4, making the suction unit 5 suck the display substrate 11 so that the display substrate 11 has an accurate preset curvature.

In this step, by adjusting the suction unit 5, a better control for the curvature of the display substrate 11 and a better supporting effect on the display substrate 11 are achieved. That is, by sucking the bottom of the display substrate 11 through the suction cup 52 and stretching the retractable support 51 of the suction unit 5, in an aspect, a supporting effect is applied on the display substrate 11 when the attaching roller 6 rolls and presses thereon; in another aspect, by sucking the display substrate 11 to move downward, the radius of curvature of the display substrate 11 is further reduced.

S5, placing the touch substrate 13 to be attached with the display substrate 11 on the adhesive layer 12 on the display substrate 11.

In this step, after the curvature of the display substrate 11 is adjusted to be a preset value, the touch substrate 13 is placed on the adhesive layer 12 on the display substrate 11 so that the touch substrate 13 has the same curvature as that of the display substrate 11.

S6, making the attaching roller 6 roll on the touch substrate 13 so that the display substrate 11 and the touch substrate 13 are compressed to be attached with each other.

Figure 4:
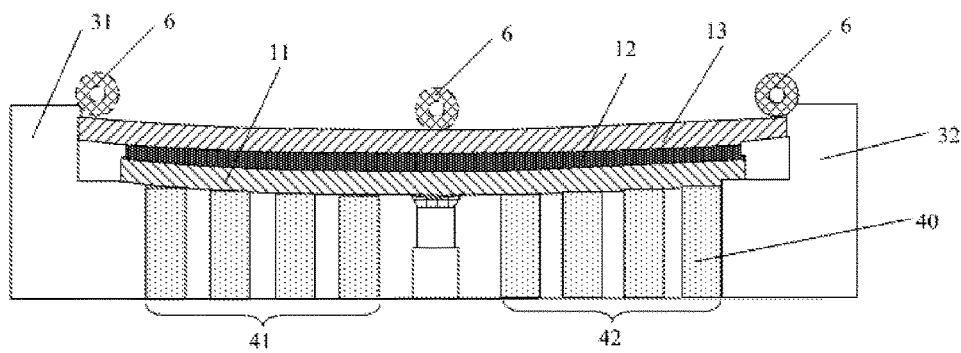
FIG. 4 shows a structural diagram of the attaching device of FIG. 2 by which the display substrate and the touch substrate are being attached with each other.

In this step, the curvature of the tracks is adjusted so that the curvature of the tracks is the same as that of the display substrate 11 and the touch substrate 13 to be attached, and the height of the tracks at any position is lower than the sum of the height of the sub-bench 40 at the corresponding position, the thickness of the display substrate 11, the thickness of the adhesive layer 12, the thickness of the touch substrate 13 and the radius of the attaching roller 6, thereby applying a downward pressure by the attaching roller 6 when the attaching roller 6 rolls on the touch substrate 13 to be attached with the display substrate 11, and a better attachment effect is obtained. As shown in FIG. 4, the attaching roller 6 contacts the top surface of the touch substrate 13, rolls and presses on the touch substrate 13 so that the display substrate 11, the adhesive layer 12 and the touch substrate 13 are compressed to be attached with each other. In FIG. 4, the identifiers indicated by the dotted lines represent positions of the attaching roller 6 during rolling.

After the above steps, the attaching method further comprises a step of ultraviolet curing the adhesive layer 12, and the curved attachment between the display substrate 11 and the touch substrate 13 is achieved.

Second Embodiment

The present embodiment provides an attaching device for a curved attachment between a display substrate and a touch substrate. Compared to the first embodiment, the attaching device of the present embodiment is provided with no suction unit.

Other structures of the attaching device of the present embodiment are the same as these of the first embodiment. Since there is no suction unit and the corresponding vacuum system, compared to the first embodiment, the attaching device of the present embodiment has a reduced cost, but has a higher requirement for toughness of the display substrate and the touch substrate to be attached with each other.

Correspondingly, the present embodiment also provides an attaching method corresponding to the attaching device for a curved attachment between a display substrate and a touch substrate, the attaching method comprises steps of:

S1, forming an adhesive layer on the display substrate to be attached with the touch substrate;

S2, placing the display substrate formed thereon with the adhesive layer on the curvature adjusting bench within the base station;

S3, adjusting distances among the sub-benches of the curvature adjusting bench to be appropriate distances so that the display substrate have a preset curvature;

S4, placing the touch substrate to be attached with the display substrate on the adhesive layer on the display substrate;

S5, making the attaching roller roll on the touch substrate so that the display substrate and the touch substrate are compressed to be attached with each other.

In the attaching device of the present invention for forming a curved display panel, by providing the curvature adjusting bench for adjusting the curvature of the display substrate and the touch substrate in the display panel and the attaching roller being capable of rolling along the curved surface of the display substrate and the touch substrate, or, by further providing the suction unit for sucking the display substrate, a curved attachment between the display substrate and the touch substrate is achieved, and the attaching device has advantages of simple structure, convenient, high efficiency and universal.

Correspondingly, the present invention also provides the attaching method for forming a curved display panel, wherein, by adjusting the curvature of the curved supporting surface of the curvature adjusting bench, the planar display substrate is curved, and by using the attaching roller to achieve the curved attachment between the display substrate and the touch substrate, it is convenient to achieve the manufacturing of the curved touch display panel.

It should be understood that, the above implementations are only exemplified to explain the principle of the present invention, but not to limit the present invention. A person skilled in the art can make various variations and modifications without departing from spirit and essence of the present invention, and these variations and modifications are also considered to be within the protection scope of the present invention.

The invention claimed is:

1. An attaching device for a curved surface attachment between a display substrate and a touch substrate, comprising a base station, a curvature adjusting bench and an attaching roller, wherein, the base station is fixed, the curvature adjusting bench includes a plurality of sub-benches with different heights and being capable of moving with respect to each other within the base station, the plurality of sub-benches are used for making the display substrate and the touch substrate to be attached, which are provided within the base station and located on the curvature adjusting bench, have a preset curvature, the attaching roller is used for rolling on the display substrate and the touch substrate to be attached so that a curved display panel is formed.

2. The attaching device of claim 1, wherein the base station includes a first station and a second station provided symmetrically, the plurality of sub-benches form a first bench and a second bench distributed symmetrically and are provided correspondingly at insides of the first station and the second station respectively; and in the first bench and the second bench, the heights of the sub-benches respectively close to the first station and the second station are highest but respectively lower than the heights of inner sides of the first station and the second station, the sub-benches in the first bench are connected with each other and are arranged successively in a direction from the first station to the second station in a descending order of height, and the sub-benches in the second bench are connected with each other and are arranged successively in a direction from the second station to the first station in a descending order of height.

3. The attaching device of claim 1, further comprises a suction unit provided at a central area within the base station, the suction unit comprises a retractable support and a suction cup provided on top of the retractable support, the suction cup is used for sucking the display substrate to be attached with the touch substrate.

4. The attaching device of claim 2, wherein the sum of distances between the sub-benches adjacent to each other is equal to or less than the distance between the first station and the second station.

5. The attaching device of claim 2, wherein in the first bench and the second bench, sub-benches adjacent to each other are connected with each other by a chain, and distances between the sub-benches adjacent to each other are adjusted by adjusting the chain; or sub-benches adjacent to each other are connected with each other by sliding rails overlapped with each other, and distances between sub-benches adjacent to each other are adjusted by adjusting overlap lengths of the sliding rails overlapped with each other.

6. The attaching device of claim 5, further comprises a control unit, the chain or the sliding rails are connected with a first motor, and the control unit controls the first motor to drive the chain or the sliding rails to move, so that the sub-benches move with respect to each other within the base station.

7. The attaching device of claim 1, wherein the attaching roller rolls along a curved surface formed by the display substrate and the touch substrate, so that the display substrate and the touch substrate are attached with each other to form the curved display panel.

8. The attaching device of claim 2, wherein the attaching roller rolls along a curved surface formed by the display substrate and the touch substrate, from the first station to the second station or from the second station to the first station, so that the display substrate and the touch substrate are attached with each other to form the curved display panel.

9. The attaching device of claim 1, wherein, tracks are provided at both sides of the plurality of sub-benches in a direction parallel to a moving direction of the sub-benches within the base station, the curvature of the tracks is adjustable according to the curvature of the display substrate and the touch substrate, and two ends of shaft of the attaching roller are inserted into the tracks, the tracks provide a defined path for rolling of the attaching roller.

10. The attaching device of claim 2, wherein, tracks are provided at both sides of the plurality of sub-benches in a direction parallel to a moving direction of the sub-benches between the first station and the second station, the curvature of the tracks is adjustable according to the curvature of the display substrate and the touch substrate, two ends of shaft of the attaching roller are inserted into the tracks, the tracks provide a defined path for rolling of the attaching roller from the first station to the second station or from the second station to the first station.

11. The attaching device of claim 1, further comprises a control unit, the attaching roller is connected with a second motor, and the control unit controls the second motor to drive the attaching roller to roll.

12. The attaching device of claim 2, further comprises a control unit, the attaching roller is connected with a second motor, and the control unit controls the second motor to drive the attaching roller so that the attaching roller rolls from the first station to the second station or from the second station to the first station.

13. The attaching device of claim 2, wherein each of the first station and the second station is of an L shape, and the L shape of the first station and the L shape of the second station are provided oppositely;

the sub-benches with highest height are provided close to inner sides of the L shapes of the first station and the second station, respectively.

14. The attaching device of claim 2, wherein each of the sub-benches is of a cuboid shape and height difference between adjacent sub-benches is less than one centimeter.

15. An attaching method implemented by the attaching device of claim 1 for attaching a display substrate and a touch substrate, comprising steps of:

S1, forming an adhesive layer on the display substrate to be attached with the touch substrate;

S2, placing the display substrate formed thereon with the adhesive layer on the curvature adjusting bench within the base station;

S3, adjusting distances among the sub-benches of the curvature adjusting bench to be appropriate distances so that the display substrate have a preset curvature;

S4, placing the touch substrate to be attached with the display substrate on the adhesive layer on the display substrate;

S5, making the attaching roller roll on the touch substrate so that the display substrate and the touch substrate are compressed to be attached with each other.

16. The attaching method of claim 15, wherein the attaching device further comprises a suction unit provided at a central area within the base station, the suction unit comprises a retractable support and a suction cup provided on top of the retractable support, the suction cup is used for sucking the display substrate to be attached with the touch substrate, and before the step of S4, the attaching method further comprises: making the suction unit suck the display substrate so that the display substrate to be attached with the touch substrate has an accurate preset curvature.

17. The attaching method of claim 15, wherein, in the step of S1, the adhesive layer is an adhesive layer of optical clear resin, and before the step of S2, the attaching method further comprises a step of ultraviolet pre-curing the adhesive layer; and after the step of S5, the attaching method further comprises a step of ultraviolet curing the adhesive layer.

18. The attaching method of claim 15, wherein, the attaching device further comprises tracks provided at both sides of the plurality of sub-benches in a direction parallel to a moving direction of the sub-benches within the base station, the curvature of the tracks is adjustable according to the curvature of the display substrate and the touch substrate, two ends of shaft of the attaching roller are inserted into the tracks, the tracks provide a defined path for rolling of the attaching roller, and in the step of S5, adjusting the curvature of the tracks so that the height of the tracks at any position is lower than the sum of the height of the sub-bench at the corresponding position, the thickness of the display substrate, the thickness of the adhesive layer, the thickness of the touch substrate and the radius of the attaching roller, thereby there applying a downward pressure by the attaching roller when the attaching roller rolls on the touch substrate to be attached with the display substrate.

* * * * *